United States Patent Office 3,055,814
Patented Sept. 25, 1962

3,055,814
NAPHTHA HYDROFORMING BY IRRADIATION
Hillis O. Folkins, Crystal Lake, Ill., assignor to The Pure Oil Company, Chicago, Ill., a corporation of Ohio
No Drawing. Filed July 30, 1958, Ser. No. 751,890
2 Claims. (Cl. 204—154)

This invention relates to a method for producing gasoline-boiling hydrocarbons of high octane value, and is more particularly directed to a method of hydroforming $C_6$-and-heavier hydrocarbons in the presence of dehydrogenation-cyclization catalysts while subjecting the hydrocarbon to high-energy radiation.

In accordance with my process, the hydrocarbon or hydrocarbons to be converted are heated to their threshold thermal decomposition temperature (the temperature at which 1% by weight of the hydrocarbon decomposes when subjected to the temperature for a period of 10 minutes in the absence of catalysts), and while at this temperature are contacted with a solid, dehydrocyclization catalyst and simultaneously subjected to the emissions from a radioactive source.

An object of the invention is to provide a method for converting hydrocarbons. Another object of the invention is to provide a method of converting low-octane hydrocarbons to high-octane hydrocarbons. Still another object of the invention is to provide a method for converting low-octane hydrocarbons to high-octane hydrocarbons at relatively low temperatures. Still another object of the invention is to provide a process for converting low-octane number, gasoline hydrocarbons into high-octane, gasoline hydrocarbons by the combination of controlled heat and radioactive energy. Further objects of the invention will become apparent from the following detailed description.

In accordance with my invention, hydrocarbons boiling within the gasoline boiling range, such as normal hexane, heptane, octane, nonane, methylcyclopentane, cyclohexane, and mixtures thereof, are heated to about the threshold thermal decomposition temperature of the hydrocarbon material. For the purpose of this invention, the threshold thermal decomposition temperature is defined as that temperature at which 1% by weight of the hydrocarbon decomposes when held at this same temperature for 10 minutes. It is apparent that the threshold thermal decomposition temperature differs for each hydrocarbon, or each mixture of hydrocarbons. While at or near the threshold thermal decomposition temperature, the hydrocarbon is contacted with a dehydrocyclization catalyst, such as platinum, palladium, or other noble metal, deposited on alumina or silica-alumina as in Patents 2,778,779 and 2,777,805, or the catalyst may be molybdenum oxide, chromium oxide, or nickel oxide or sulfide, on a carrier such as activated alumina, as disclosed in Patent 2,765,261. Hydrogen is mixed with the hydrocarbon charge in an amount within the range of about 0.5 to 15 mols of hydrogen per mol of hydrocarbon. The pressures in the reaction zone may vary from about atmospheric to about 1000 p.s.i. or more. Liquid hourly space velocities based on liquid charge may vary from about 0.02 to 50.

While the hydrocarbon-hydrogen mixture is in contact with the catalyst it is exposed to high-energy radiation from radioactive isotopes or other suitable sources. These radiations include gamma-rays, neutrons, deuterons, hard X-rays, high-energy electrons, alpha-particles, beta-particles, and the like. Energies of these radiations generally should be in the range of 0.4 to 20 mev., or greater. Suitable sources include nuclear reactors for neutron and/or gamma-radiation, and fission products in spent fuel elements from nuclear reactors for gamma-radiation. Radioactive isotopes commonly employed for gamma-radiation include cobalt 60, which emits gamma-rays of 1.17 and 1.33 mev. energy, and cesium 137, which emits gamma-radiation of 0.7 mev. energy. Radon is a source of alpha-particle emission. Linear accelerators, Van de Graaff machines, and resonant transformers are sources for the production of electron beams at high fluxes and of energies ranging up to 20 mev. or higher. These machines also may be employed as sources for neutrons, gamma-rays, etc., by bombardment of suitable targets or by suitable modifications. Other sources include the cyclotron, betatron, etc., such as are described in much of the current literature. Radiation from many other radioactive isotopes, such as uranium 235, potassium 40, strontium 90 and thorium 233, also may be used.

This invention differs from prior art processes in that instead of heating the hydrocarbons to an elevated temperature at which rapid decomposition and hydrocracking to gas and coke accompany the desired isomerization, dehydrogenation and cyclization reactions, the hydrocarbons are heated to a lower temperature at which hydrocracking occurs sufficiently slowly so that the amount of coke and gas is less than that conventionally produced while the dehydrocyclization reaction is promoted by the effect of radiation. This results in greater selectivity for the desired reactions, and in the reforming of naphthas produces a higher octane-yield relationship. The process of this invention also results in a longer catalyst life in comparison to non-regenerative-type reforming catalysts and processes, and in longer process-cycle periods, at high activity, with catalysts and processes designed for operation on a regenerative-cycle basis.

Although the threshold thermal decomposition temperature for any particular mixture of hydrocarbons can readily be determined, this temperature generally is about 50–200° F. below the temperature at which catalytic hydroforming is ordinarily carried out in the absence of irradiation.

As an example of the process of this invention, normal heptane is mixed with hydrogen in a mol ratio of 1 and passed through a fixed-bed catalyst consisting of molybdena on activated alumina, containing 9.5% of molybdena, at 150 p.s.i. pressure and at 900° F., at a liquid hourly space velocity of 1. A 25% yield of toluene is obtained, and the gas make is 6%. Under the same reaction conditions, except that the reactor is exposed to radiation from a cobalt 60 source having a radiation intensity of about 235,000 roentgen per hour, a toluene yield of 35% is obtained, with a gas production of 6%.

It is apparent that the radiation source can be located outside the reaction chamber provided that the radiations are types which have a sufficiently high degree of penetration, such as gamma-rays. Suitable methods are known for subjecting liquid or gaseous materials undergoing reaction to gamma-radiation in shielded facilities. Alternately, the radioactive source or elements may be incorporated within the reactor, either in the form of a discrete source, or of a radioactive dispersion distributed within the catalyst bed or the individual catalyst pellets. Placement of the radioactive source within the reactor may be necessary to obtain a satisfactory radiation flux if the source of radiation emits alpha-particles, electrons, or other radiations of low penetrating power. In this way, the catalyst and reacting hydrocarbons are in direct contact with the radiation source.

While the foregoing example specifies a temperature of 900° F., it should be understood that lower temperatures may be employed, especially when hydrocarbons of higher molecular weight are charged. For example, when the charge-stock is a straight-run naphtha having a boiling range in the neighborhood of 250–400° F., the preferred reaction temperature is in the range of 750–

850° F., the specific temperature being dependent upon the conversion desired, and upon the operating conditions and radiation flux employed. Under conventional processing, when a naphtha of 250–400° F. boiling range is reformed over a molybdena catalyst at 975° F., 250 p.s.i.g., a liquid volume hourly space velocity of 3.0, and at a hydrogen-to-hydrocarbon mol ratio of 2.5, an 87 weight percent yield of reformate, having an F–1 octane number of 86, is obtained. The aromatic content of the product is 41 volume percent. At 825° F., and with the other operating conditions the same, irradiation of the system with a 350,000 r./hour source of gamma-rays effects a reformate yield from this naphtha of 86 weight percent; this reformate has an F–1 octane number of 88 and an aromatic content of 45 volume percent. These results show the beneficial effects of radiation in permitting lower temperatures of operation and in increasing selectivity of reaction.

I claim:

1. The method of hydroforming charging stock composed essentially of straight-run naphtha boiling in the range of about 250–400° F. to higher octane number higher aromatic content gasoline boiling range product stock comprising heating said naphtha to approximately the threshold thermal decomposition temperature of said naphtha, said temperature being in the range of 750 to 850° F., and contacting said naphtha, in admixture with hydrogen while at said temperature, with a solid dehydrocyclization catalyst while subjecting the mixture to exposure to high energy, ionizing radiation of about 0.4 to 20.0 m.e.v. energy level in a dose of about 350,000 roentgens per hour, for a period of 0.02 to 50 hours.

2. Method in accordance with claim 1 in which the radioactive source is cobalt 60.

References Cited in the file of this patent

UNITED STATES PATENTS

| | | |
|---|---|---|
| 2,743,223 | McClinton et al. | Apr. 24, 1956 |
| 2,905,606 | Long et al. | Sept. 22, 1959 |

FOREIGN PATENTS

| | | |
|---|---|---|
| 665,263 | Great Britain | Jan. 23, 1952 |